US007142821B1

(12) United States Patent
Mohuchy et al.

(10) Patent No.: US 7,142,821 B1
(45) Date of Patent: Nov. 28, 2006

(54) RADIO FREQUENCY TRANSMITTING AND RECEIVING MODULE AND ARRAY OF SUCH MODULES

(75) Inventors: Wolodymyr Mohuchy, Nutley, NJ (US); Louis Martin Ludwig, Wayne, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 568 days.

(21) Appl. No.: 10/323,509

(22) Filed: Dec. 19, 2002

(51) Int. Cl.
*H04B 1/38* (2006.01)

(52) U.S. Cl. ........................ 455/73; 455/13.3; 455/19; 455/25; 343/844; 343/853; 343/893; 342/368

(58) Field of Classification Search ............ 343/700 R, 343/700 MS, 895, 725, 770, 776, 780, 844, 343/853, 893; 455/561, 562.1, 13.3, 19, 455/25, 73; 342/368
See application file for complete search history.

(56) References Cited

U.S. PATENT DOCUMENTS

| | | | | |
|---|---|---|---|---|
| 4,194,519 | A * | 3/1980 | Baker et al. | 137/15.1 |
| 4,431,998 | A * | 2/1984 | Finken | 343/797 |
| 4,896,165 | A * | 1/1990 | Koizumi | 343/881 |
| 6,330,158 | B1 * | 12/2001 | Akram | 361/704 |
| 6,593,881 | B1 * | 7/2003 | Vail et al. | 342/368 |
| 6,842,157 | B1 * | 1/2005 | Phelan et al. | 343/893 |

* cited by examiner

*Primary Examiner*—Edward F. Urban
*Assistant Examiner*—Raymond S. Dean
(74) *Attorney, Agent, or Firm*—RatnerPrestia

(57) ABSTRACT

A radio frequency transmitting and receiving module having a support housing that has a hexagonal face member mounted to the support housing. This face member has an antenna for transmitting and receiving radio frequency signals. Mounted within the support housing is circuitry for (a) conducting radio frequency signals to the antenna for transmission by the antenna, and (b) conducting radio frequency signals received by the antenna from the antenna for processing. Such a module, functioning as a hexagonal power unit core, can be fixed in a honeycomb cellular array employing “plug and play” assembly techniques.

18 Claims, 8 Drawing Sheets

RADIO FREQUENCY TRANSMITTING AND RECEIVING MODULE AND ARRAY OF SUCH MODULES

FIELD OF THE INVENTION

The present invention relates, in general, to radio frequency transmitters and receivers and, in particular, to fully integrated modules that include an antenna and the networks for transmitting and receiving radio frequency signals over a broad frequency range as stand-alone systems or as modular components of linear, planar and application-specific phased arrays.

BACKGROUND OF THE INVENTION

Advances in the development of monolithic microwave integrated circuits (MMIC) combined with the application of multi-layer low temperature cofired ceramic (LTCC) technology has reduced dramatically the size of radio frequency networks, including the generation of solid state transmitter power. This, in turn, allows for a high level of integration and miniaturization of both the transmitting/receiving radio frequency paths and the ancillary control networks that can now be brought forward and integrated with the radiating aperture.

Among the benefits derived from such arrangements are (a) improved efficiency and lower power dissipation in the radio frequency paths, (b) decreased requirements on the power supply, (c) improved system reliability, (d) elimination of multiple housings and cumbersome interconnects, and (e) more flexible, conformal installations, particularly on space-limited platforms.

SUMMARY OF THE INVENTION

A radio frequency transmitting and receiving module, constructed in accordance with the present invention, includes a support housing and a hexagonal face member mounted to the support housing and having an antenna for transmitting and receiving radio frequency signals. Also included in this module is circuitry within and mounted to the support housing for conducting radio frequency signals to the antenna for transmission by the antenna and conducting radio frequency signals received by the antenna from the antenna for processing.

According to a second aspect of the present invention, radio frequency transmitting and receiving module includes a support housing having a first end plate, a second end plate, and means for securing together the first end plate and the second end plate. This module also has an antenna mounted to the first end plate for transmitting and receiving radio frequency signals and circuitry that includes a transmit/receive module on a first substrate and control electronics and power conditioning networks on a second substrate. The first and second substrates are within the housing and sandwiched between the first end plate and the second end plate. The circuitry conducts radio frequency signals to the antenna for transmission by the antenna and conducts radio frequency signals received by the antenna from the antenna for processing.

According to another aspect of the present invention, a radio frequency transmitting and receiving module, constructed in accordance with the present invention, is used in an array of such modules that are fixed in a desired pattern.

DETAILED DESCRIPTION OF THE INVENTION

Figure 1:
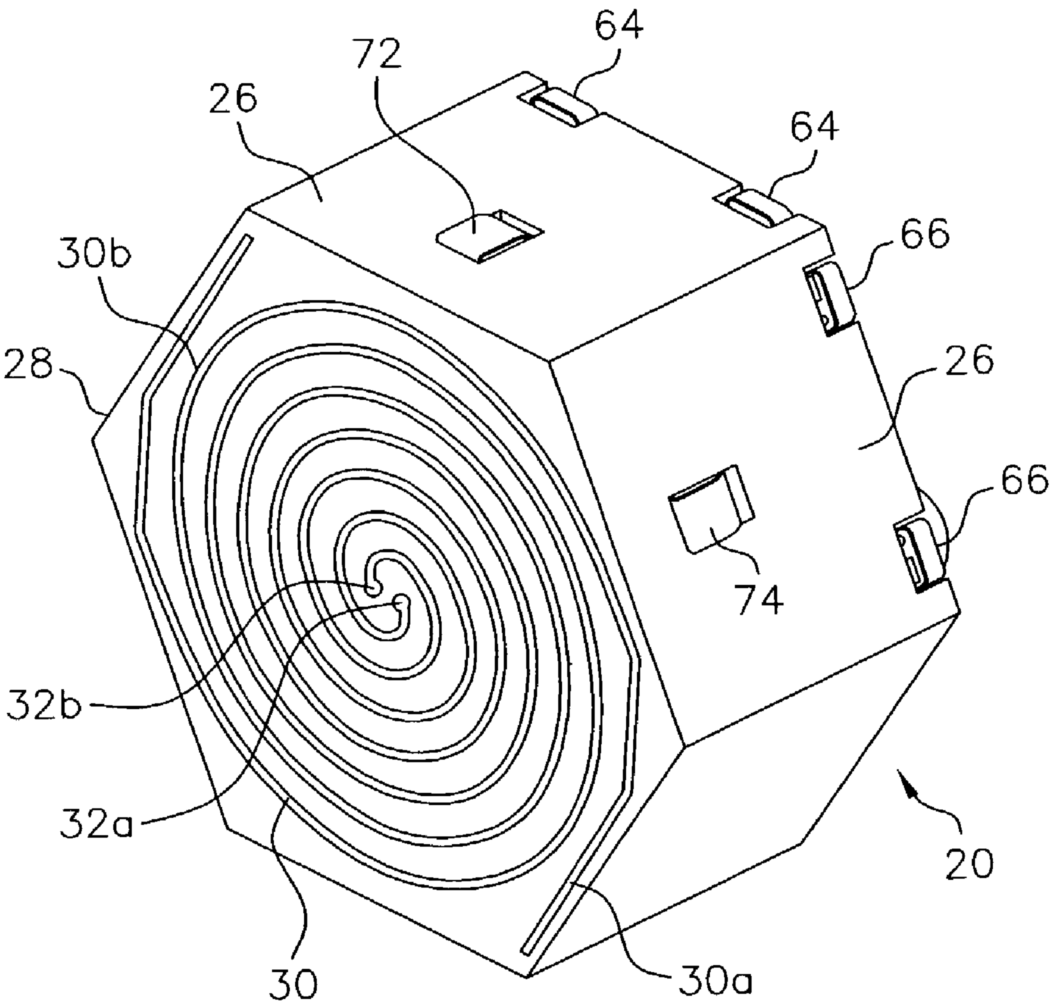
FIG. 1 is a perspective view of a first embodiment of a radio frequency transmitting and receiving module constructed in accordance with the present invention.
Figure 2:
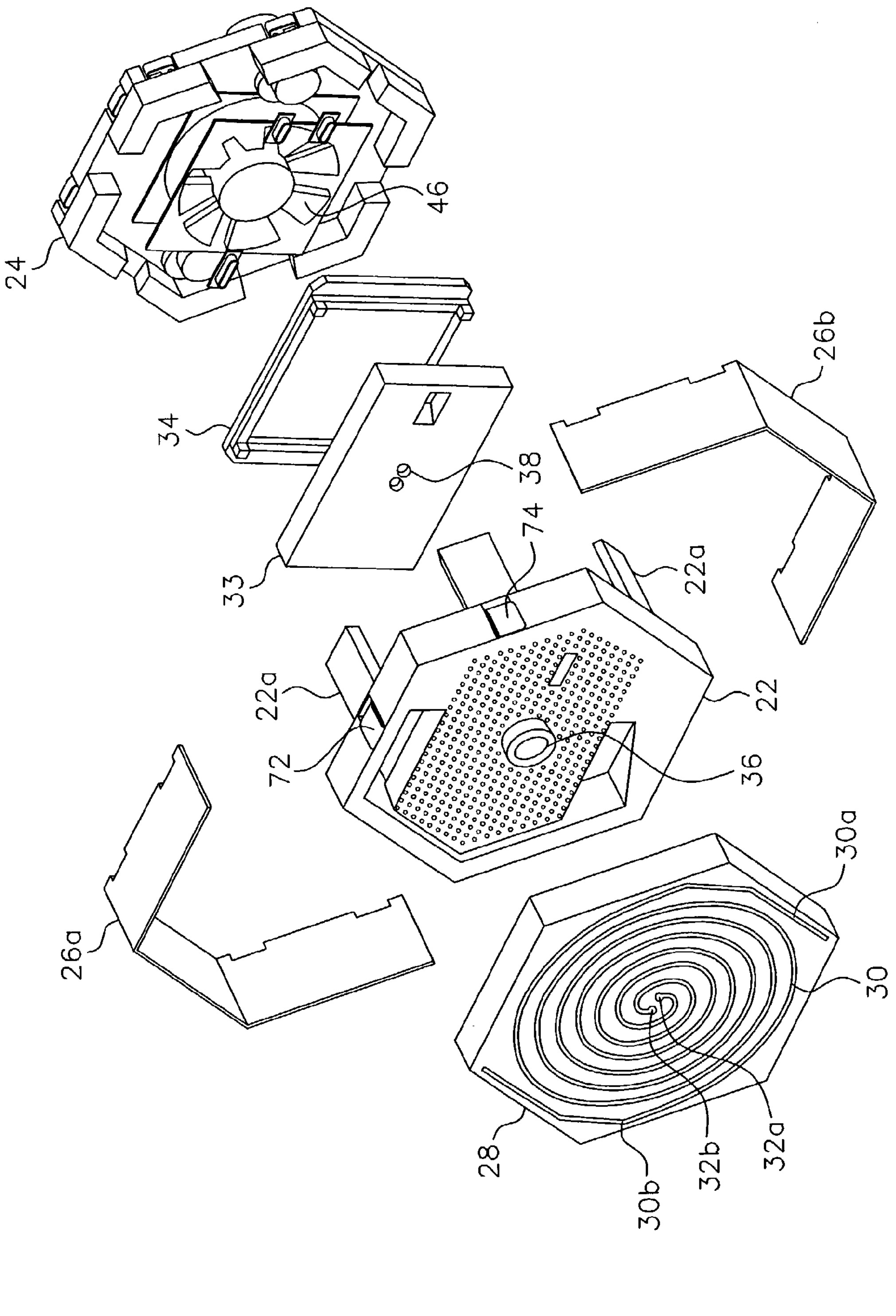
FIG. 2 is an exploded perspective view of the FIG. 1 radio frequency transmitting and receiving module.
Figure 3:
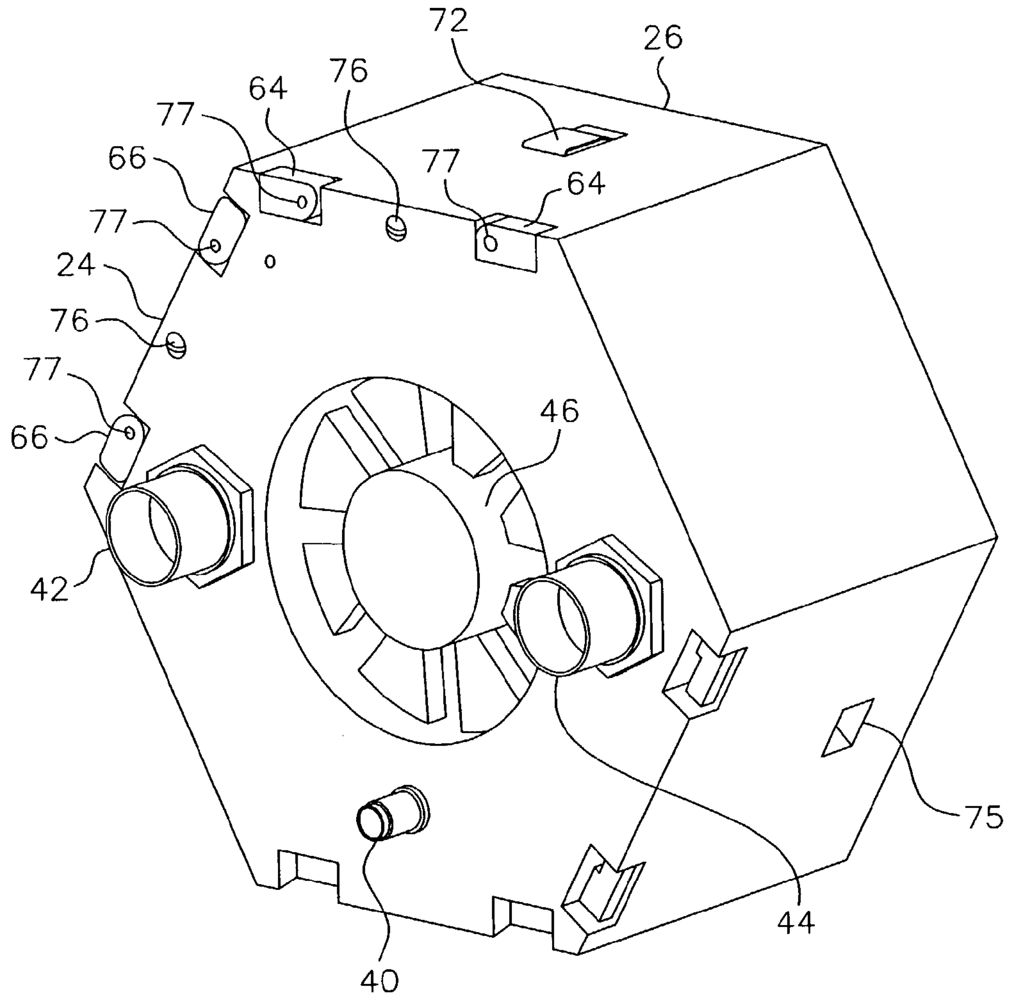
FIG. 3 is a perspective view, taken from the rear, of the FIG. 1 radio frequency transmitting and receiving module.

Referring to FIGS. 1, 2, and 3, a radio frequency transmitting and receiving module 20, constructed in accordance with the present invention, includes a support housing. For the embodiment of the invention being described, the support housing includes a hexagonal first end plate 22 at a first end of the support housing and a hexagonal second plate 24 at a second end of the support housing. Hexagonal end plates 22 and 24 are shown aligned. These end plates are secured together by suitable means, such as a plurality of screws (not shown), that pass through second end plate 24 and are received in fingers 22*a* of first end plate 22.

A cowling 26, also hexagonal, extends around the peripheral edges of first end plate 22 and second end plate 24. As shown most clearly in FIG. 2, cowling 26 is composed of two parts 26*a* and 26*b* that are attached to first end plate 22 and second end plate 24 by suitable means, such as a plurality of screws, disposed at locations that secure the cowling parts to the end plates.

A radio frequency transmitting and receiving module, constructed in accordance with the present invention, further includes a hexagonal face member 28 mounted to the support housing. For the embodiment of the invention being described, hexagonal face member 28 is mounted to first end plate 22 of the support housing.

Hexagonal face member 28 has an antenna 30 for transmitting and receiving radio frequency signals. Antenna 30 preferably is a high-power, reflective-cavity backed spiral antenna composed of first and second interlaced spiral windings 30*a* and 30*b*.

Various configurations of antenna 30 can be used. For the two interlaced spiral winding configuration illustrated in FIGS. 1 and 2, spiral windings 30*a* and 30*b* are Archimedean progressions that unfurl from a pair of radio frequency input terminals 32*a* and 32*b*, respectively, with the final turn of each end portion of each spiral winding including a logarithmic progression. The final turn of the first spiral winding slowly widens to a maximum width and then slowly tapers to a minimum width at an end point. Other spiral configurations, such as sinuous, four square or multi-arm configurations can be used.

A radio frequency transmitting and receiving module, constructed in accordance with the present invention, also includes circuitry within and mounted to the support housing for conducting radio frequency signals to antenna 30 for transmission by the antenna and conducting radio frequency signals received by the antenna from the antenna for processing. This circuitry includes a transmit/receive module on a first substrate 33 and control electronics and power conditioning networks on a second substrate 34.

First end plate 22 has a passage 36 for a radio frequency antenna launch 38 that is on first substrate 33 and treated as part of the transmit/receive module on first substrate 33. Second end plate 24 serves as an external interface plate for a connector 40 to provide input radio frequency and connectors 42 and 44 to provide input control and DC power. Antenna launch 38 can be a twin-wire transmission line, including parallel conductors, that extend through first end plate 22 and are connected to radio frequency input terminals 32*a* and 32*b* of spiral windings 30*a* and 30*b*, respectively.

A radio frequency transmitting and receiving module, constructed in accordance with the present invention, preferably includes a cooling fan 46 mounted to the support housing. As shown most clearly in FIG. 3, cooling fan 46 is mounted on second end plate 24 of the support housing. First end plate 22 of the support housing is perforated for cooling radio frequency transmitting and receiving module 20.

In summary, the structure of the radio frequency transmitting and receiving module 20 described above includes a support housing having a first end plate 22, a second end plate 24, and a cowling 26. Circuitry that includes a transmit/receive module on a first substrate 33 and control electronics and power conditioning networks on a second substrate 34 is sandwiched between the first end plate and the second end plate of the support housing and the cowling of the support housing envelopes the first end plate and the second end plate of the support housing, the circuitry, and cooling fan 46.

The specific construction of a radio frequency transmitting and receiving module, constructed in accordance with the present invention, is dependent on the operating frequency of the module. At frequencies beyond the high frequency region, the radiating aperture 36 is significantly smaller than at lower frequencies and certain of the components, located within and supported by the support housing, are disposed differently.

Figure 4:
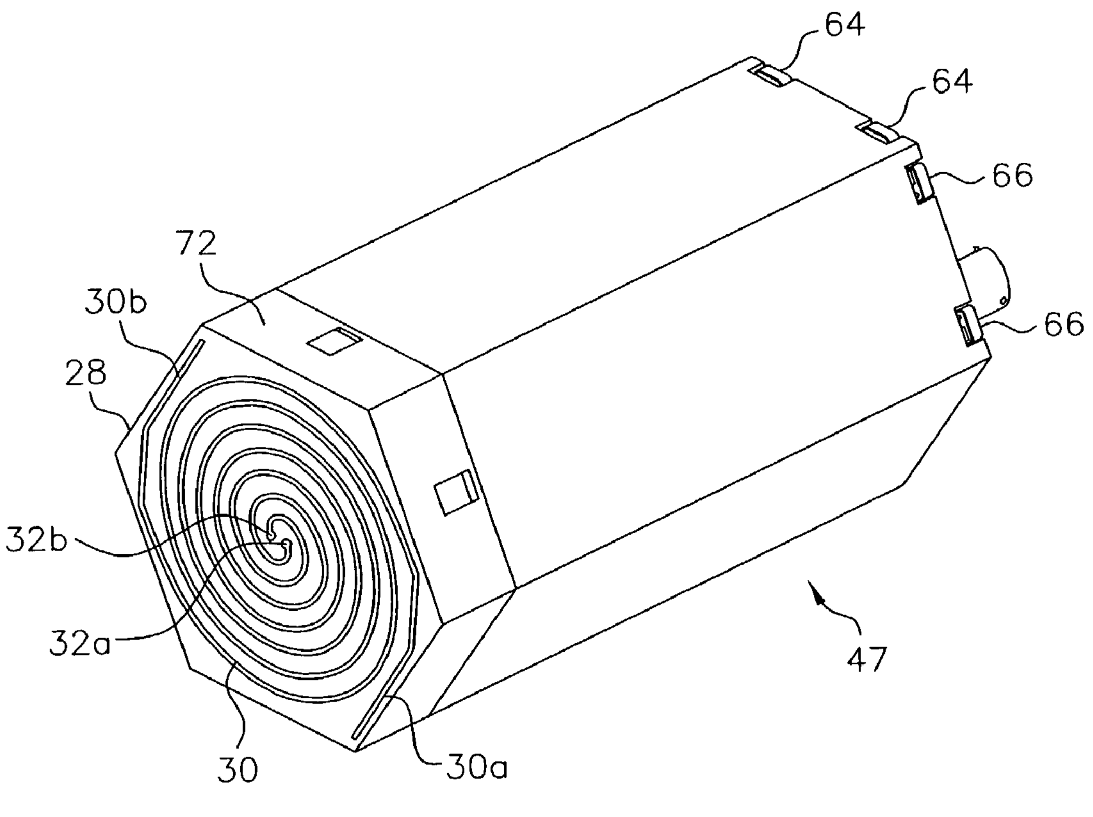
FIG. 4 is a perspective view of a second embodiment of a radio frequency transmitting and receiving module constructed in accordance with the present invention.
Figure 5:
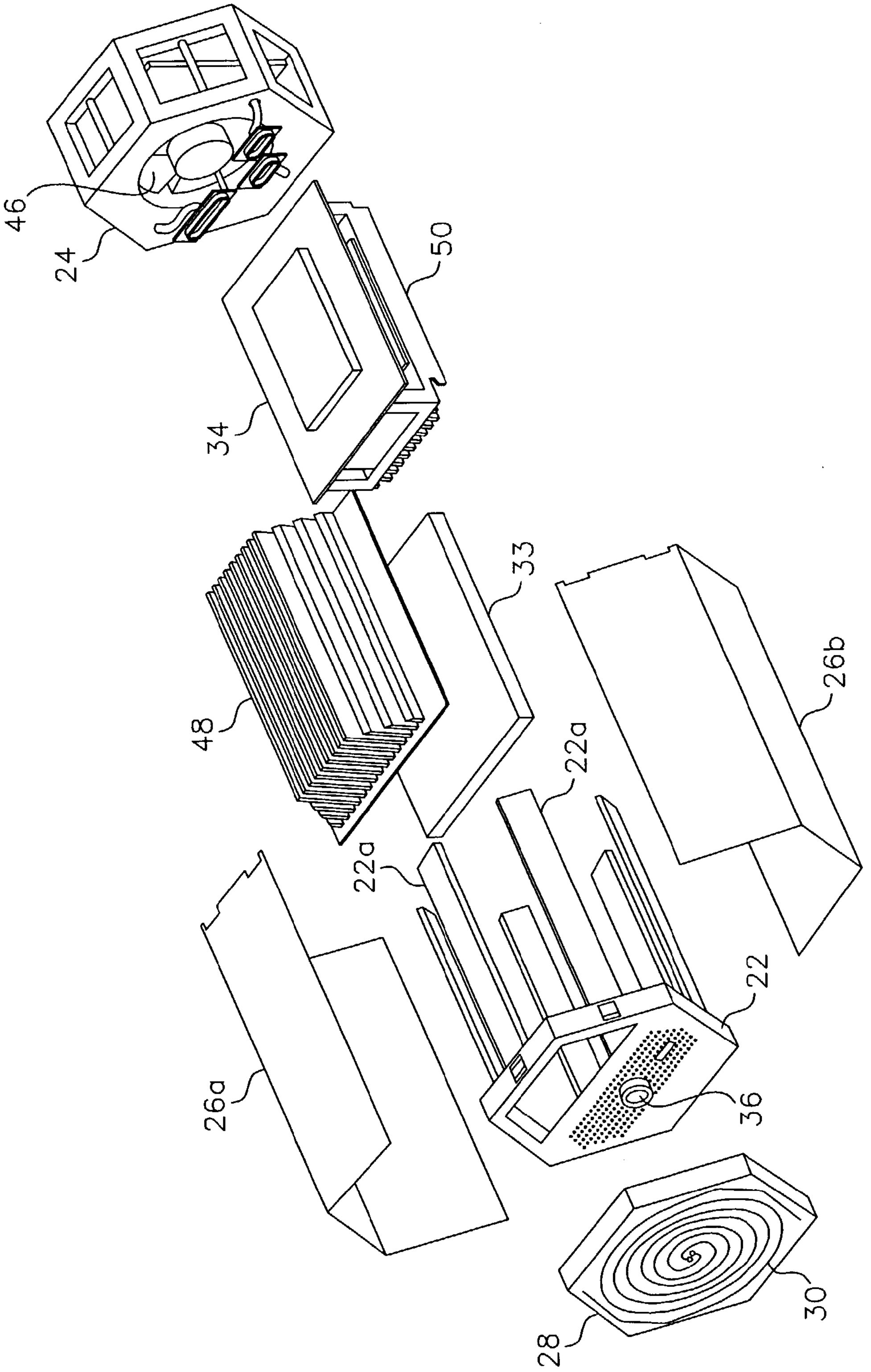
FIG. 5 is an exploded perspective view of the FIG. 4 radio frequency transmitting and receiving module.

FIGS. 4 and 5 illustrate a second embodiment of a radio frequency transmitting and receiving module 47 constructed in accordance with the present invention. The radio frequency transmitting and receiving module illustrated by FIGS. 4 and 5 operates at frequencies higher that the one illustrated by FIGS. 1, 2, and 3. The second embodiment of the present invention, while generally similar to the first embodiment illustrated, differs from the first embodiment in two respects. First, substrate 33, that carries the transmit/receive module, and substrate 34, that carries the control electronics and power conditioning networks, are disposed parallel to the axis of the radio frequency transmitting and receiving module rather than transverse to the axis of the radio frequency transmitting and receiving module as with the first embodiment. Second, the embodiment of FIGS. 4 and 5 includes a pair of heat sinks 48 and 50, attached, respectively, to substrate 33 that carries the transmit/receive module and to substrate 34 that carries the control electronics and power conditioning networks.

In all other respects, the radio frequency transmitting and receiving module 47 of FIGS. 4 and 5 is similar to the radio frequency transmitting and receiving module 20 FIGS. 1, 2, and 3. The radio frequency transmitting and receiving module 47 of FIGS. 4 and 5 includes a support housing having a first end plate 22, a second end plate 24, and a two-part cowling 26*a* and 26*b*. Circuitry that includes a transmit/receive module on a first substrate 33 and control electronics and power conditioning networks on a second substrate 34 heat sinks 48 and 50 are sandwiched between the first end plate and the second end plate of the support housing and the cowling of the support housing envelopes the first end plate and the second end plate of the support housing, the circuitry, the heat sinks and a cooling fan. The end plates are secured together by suitable means, such as a plurality of screws (not shown), that pass through second end plate 24 and are received in fingers 22*a* of first end plate 22. A hexagonal face member 28, having an antenna 30, is mounted to first end plate 22 of the support housing.

Figure 6:
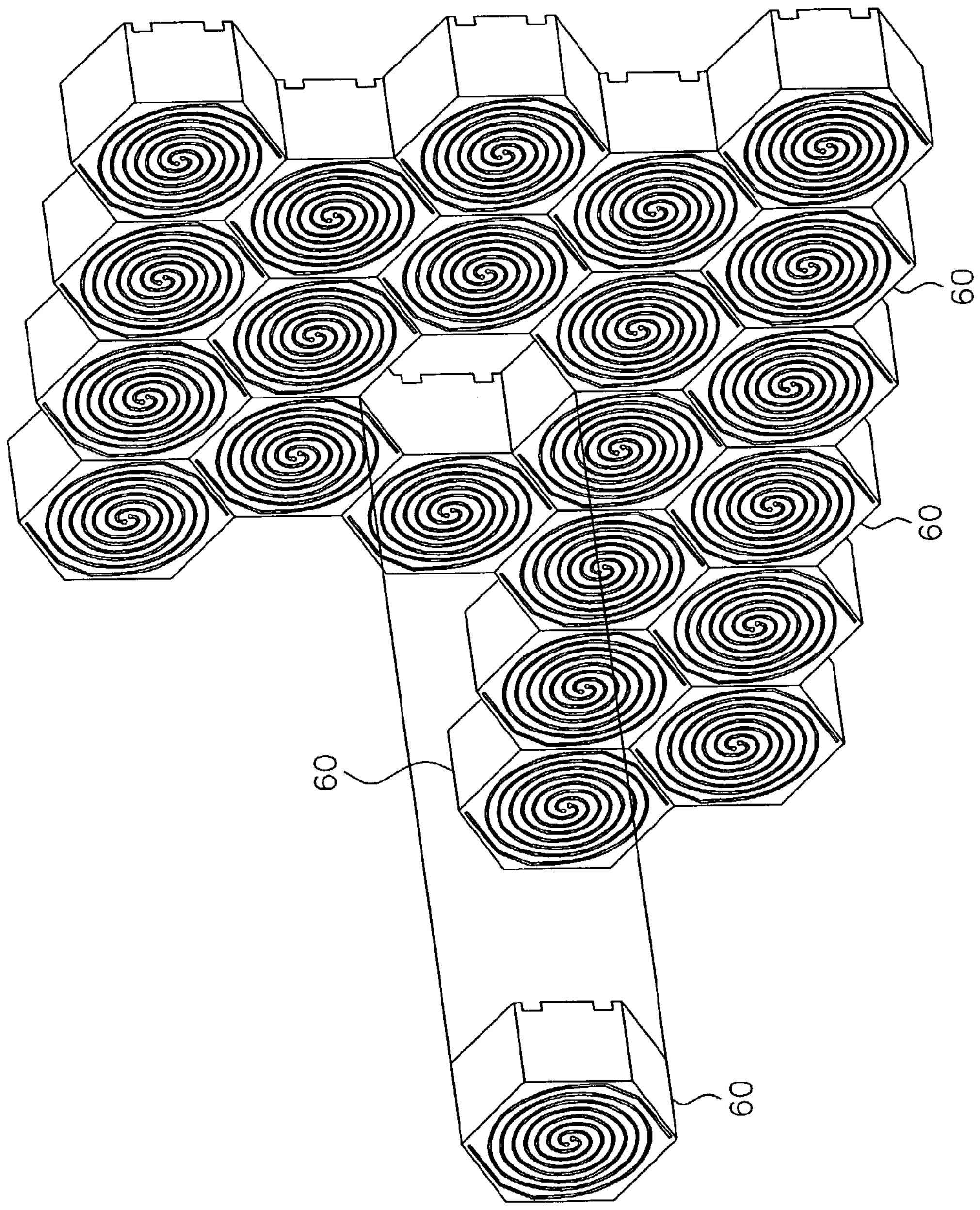
FIG. 6 is a perspective view of an array of radio frequency transmitting and receiving modules constructed in accordance with the present invention.
Figure 8:
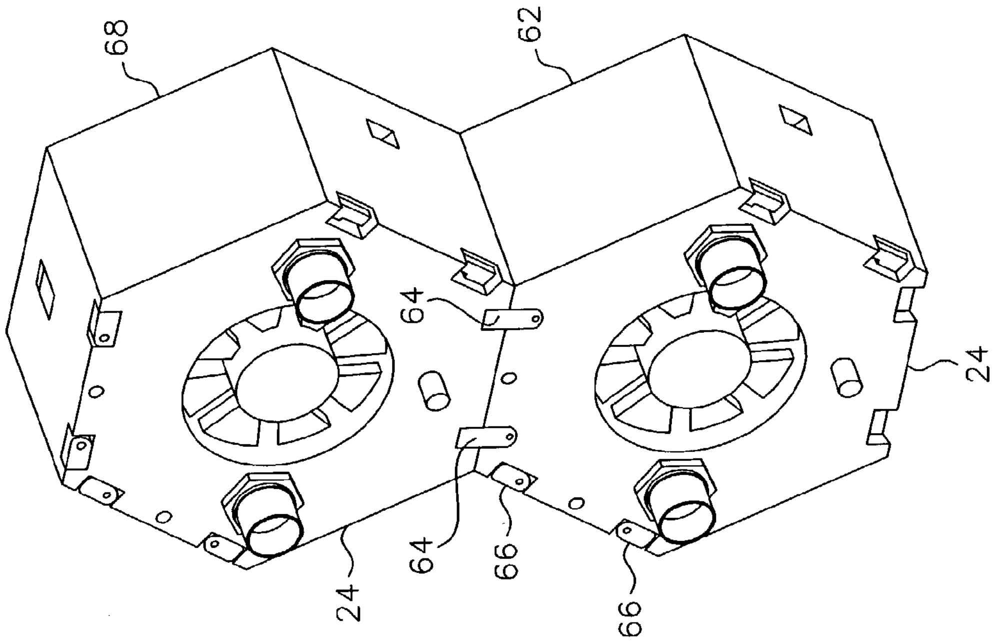
FIG. 8 is a perspective view of two FIG. 1 radio frequency transmitting and receiving modules after being attached together in an array.
Figure 7:
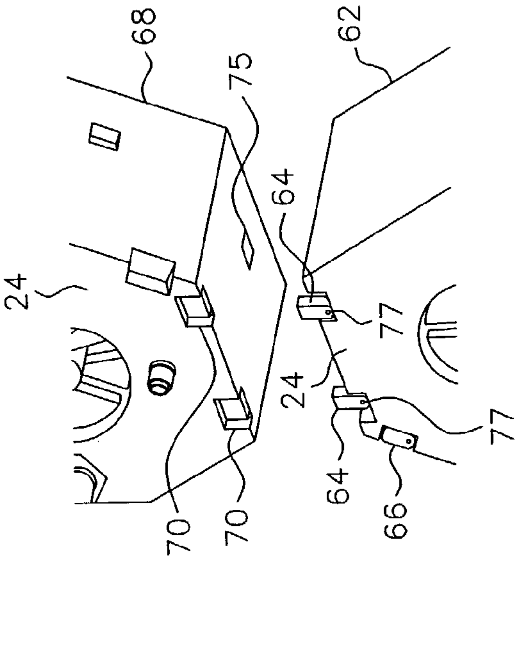
FIG. 7 is a perspective view of parts of two FIG. 1 radio frequency transmitting and receiving modules prior to being attached together in an array.

FIG. 6 is a perspective view of an array of radio frequency transmitting and receiving modules 60 constructed in accordance with the present invention. Modules 60 are fixed in a desired pattern by means that are illustrated in FIGS. 1 through 4, 7 and 8.

Referring to FIGS. 1 through 4, 7 and 8, second end plate 24 of a first module 62 has a first pair of rear mounting claws 64 on a first hexagonal edge and second pair of rear mounting claws 66 on a second hexagonal edge adjacent the first hexagonal edge. A second end plate 24 of a second module 68 has a pair of rear mounting pockets 70 on a hexagonal edge within which the first pair of rear mounting claws 64 are received. The second end plate of a third module (not shown) has a pair of rear mounting pockets on a hexagonal edge within which the second pair of rear mounting claws 66 are received.

First end plate 22 of module 62 (module 20 in FIG. 1) has a first forward mounting claw 72 on a first hexagonal edge and a second forward mounting claw 74 on a second hexagonal edge adjacent the first hexagonal edge. A first end plate 22 of second module 68 has a forward mounting pocket 75 on a hexagonal edge within which first forward mounting claw 72 is received. The first end plate of the third module (not shown) has a forward mounting pocket on a hexagonal edge within which second forward mounting claw 74 is received.

The radio frequency transmitting and receiving modules 60 are arranged in an array by first aligning the proper mating surfaces of the modules so that they touch each other. Next, a jackscrew 76, accessible at the second end plate as shown in FIG. 3, is advanced to raise and associated forward mounting claw into the forward mounting pocket of the mating radio frequency transmitting and receiving module with which the forward mounting claw is aligned. Then set screws 77 on the rear mounting claws, shown most clearly in FIG. 3, are loosened and the associated rear mounting claws are pivoted 90° into the rear mounting pockets in the adjacent radio frequency transmitting and receiving module with which the rear mounting claws are aligned. In the final step, the set screws 77 on the rear mounting claws are tightened, thereby providing mating tension with the forward mounting claw that has been received in the associated forward mounting pocket in the mating radio frequency transmitting and receiving module.

Once a given radio frequency transmitting and receiving module is given the position coordinates of its location in an array with respect to a reference module, an internal microprocessor translates the position for setting a true time delay network in execution of array beam steering. If simultaneous multiple beams are required, the microprocessor will account for array aperture segmentation. These functions can be exercised in both the transmit mode and the receive mode as required by the specific application.

Figure 9:
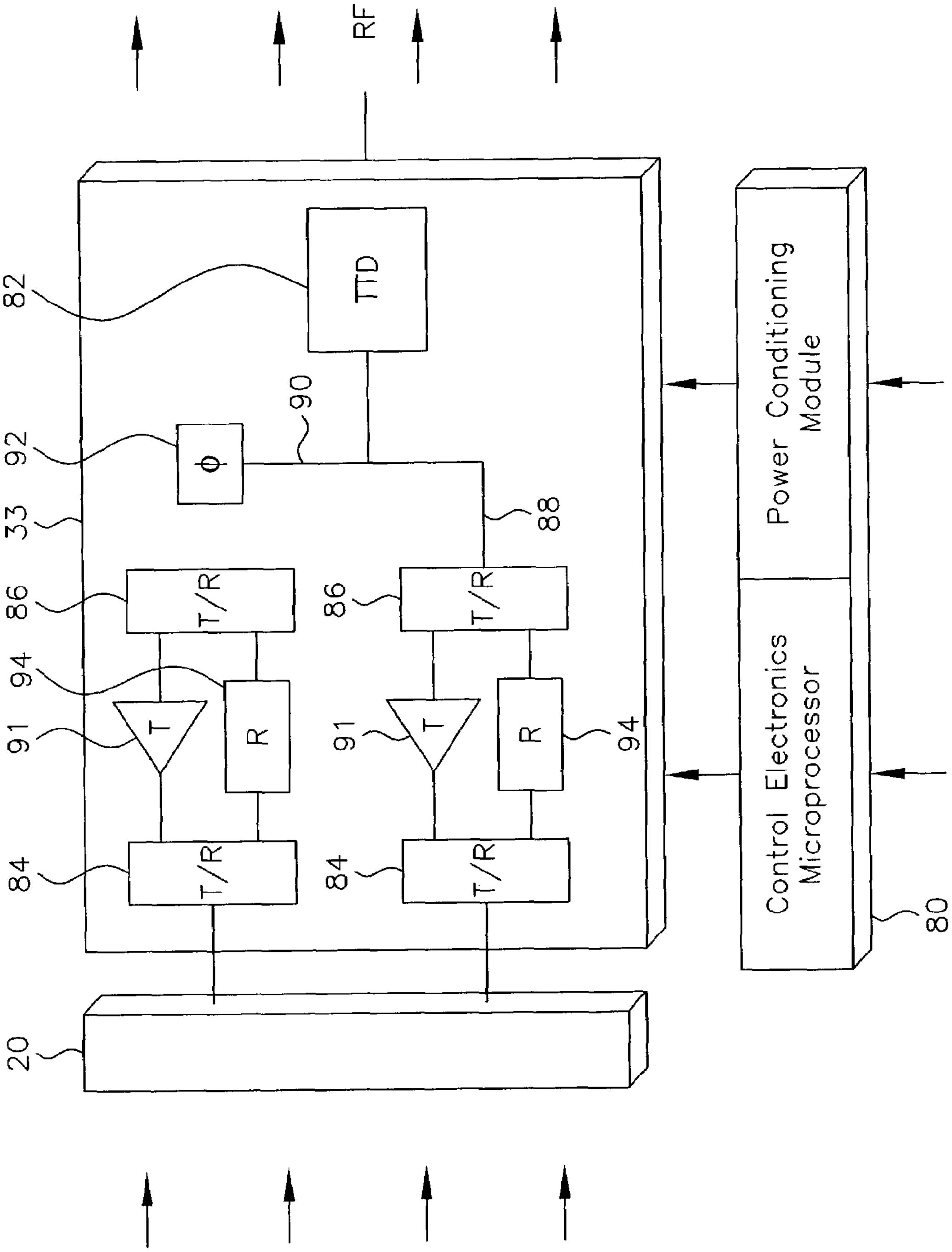
FIG. 9 is a block diagram of a preferred embodiment of the system architecture of a radio frequency transmitting and receiving module constructed in accordance with the present invention.

FIG. 9 is a block diagram of a preferred embodiment of the system architecture of a radio frequency transmitting and receiving module constructed in accordance with the present invention. At the initial deployment of the radio frequency transmitting and receiving module, a microprocessor 80 determines whether the unit is operating as a stand-alone module or as part of a phased array. For stand-alone operation, a true time delay network 82 is by-passed. Channel selectors 84 are latched for either transmission or reception. In transmission, power amplifiers 86 are activated and respond appropriately to input radio frequency pulses and modulations.

There are two parallel channels 88 and 90 in this portion of the radio frequency path allowing for doubling the output power of a given radio frequency transmitting and receiving module. This results in practical advantages. First, each of the output transmitters 91 operates at a reduced power level, thus increasing the system reliability. Second, the heat generated within each radio frequency transmitting and receiving module is distributed for more efficient cooling.

The output from transmitters is fed to the radiating element (not shown in FIG. 9). Because the radiating elements in the two embodiments of the invention being described are interlaced spiral windings, the relative phase of the two feeds are at 180°, an operating feature well-known in the art. For this purpose, a fixed 180° phase bit 92 is included in one of the radio frequency paths. In receive mode, the radio frequency progression is reversed via the channel selectors 84 and the received signal is available at the radio frequency port for system processing and analysis.

A significant feature of the dual transmit/receive paths in the system architecture is the capability of replacing the interlaced spiral windings antenna with a dual polarized antenna, such as a log periodic or sinuous antenna, and providing a polarization-diverse antenna module.

When the radio frequency transmitting and receiving module is deployed in a phased array, the array control electronics provides the beam steering commands to the true time delay network 82 both in transmission and reception. Receivers 94 within the module are combined at the input to true time delay network 82 and proceed via the radio frequency path to the array processor.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An array of radio frequency transmitting and receiving modularized modules, each modularized module comprising:

a separate support housing for each modularized module;

a hexagonal face member mounted to each of said support housing and having an antenna for transmitting and receiving radio frequency signals; and circuitry within and mounted to each of said support housing for:

(a) conducting radio frequency signals to said antenna for transmission by said antenna, and (b) conducting radio frequency signals received by said antenna from said antenna for processing, wherein each separate support housing includes walls configured to form a hexagonal perimeter, and at least one of the walls of one support housing of a modularized module is touching at least one of the walls of a support housing of another modularized module.

2. A radio frequency transmitting and receiving module according to claim 1 wherein said antenna is a high-power, reflective-cavity backed spiral antenna composed of first and second interlaced spiral windings.

3. A radio frequency transmitting and receiving module according to claim 2 wherein said circuitry includes:

(a) a transmit/receive module on a first substrate, and (b) control electronics and power conditioning networks on a second substrate.

4. A radio frequency transmitting and receiving module according to claim 3 further including a cooling fan mounted within and to said support housing.

5. A radio frequency transmitting and receiving module according to claim 4 wherein said support housing includes:

(a) a first end plate at a first end of said support housing on which said hexagonal face member is mounted, (b) a second plate at a second end of said support housing on which said cooling fan is mounted, and (c) a cowling extending around the peripheral edges of said first end plate and said second end plate and enveloping said first end plate, said second end plate, said circuitry, and said cooling fan.

6. A radio frequency transmitting and receiving module according to claim 5 wherein said cowling is composed of two parts that are secured to said first end plate and said second end plate.

7. A radio frequency transmitting and receiving module according to claim 6 wherein said first substrate and said second substrate are disposed transverse to the axis radio frequency transmitting and receiving module as with the first embodiment.

8. A radio frequency transmitting and receiving module according to claim 6 wherein said first substrate and said second substrate are disposed parallel to the axis of the radio frequency transmitting and receiving module.

9. A radio frequency transmitting and receiving module according to claim 8 further including a first heat sink attached to said first substrate and a second heat sink attached to said second substrate.

10. A radio frequency transmitting and receiving modularized module for incorporation into an array of modules comprising:

a separate support housing for each modularized module including:

(a) a first end plate, and (b) a second end plate secured to said first end plate; and an antenna mounted to said first end plate for transmitting and receiving radio frequency signals; and circuitry including:

(a) a transmit/receive module on a first substrate, and (b) control electronics and power conditioning networks on a second substrate within said separate housing and sandwiched between said first end plate and said second end plate for:

(a) conducting radio frequency signals to said antenna for transmission by said antenna, and (b) conducting radio frequency signals received by said antenna from said antenna for processing, wherein each separate support housing includes walls configured to form a hexagonal perimeter, and at least one of the walls of one support housing of a modularized module is touching at least one of the walls of a support housing of another modularized module.

11. A radio frequency transmitting and receiving module according to claim 10 further including a cooling fan mounted to said second end plate.

12. A radio frequency transmitting and receiving module according to claim 11 wherein said means for securing together said first end plate and said second end plate include first and second cowling members extending around the peripheral edges of said first end plate and said second end plate and enveloping said first end plate, said second end plate, said transmitter/receiver circuitry module, and said cooling fan.

13. A radio frequency transmitting and receiving module according to claim 12 wherein said antenna is a high-power, reflective-cavity backed spiral antenna composed of first and second interlaced spiral windings.

14. An array of radio frequency transmitting and receiving modularized modules comprising:

a plurality of radio frequency transmitting and receiving modularized modules disposed in a desired pattern and each having:

(a) a separate support housing for each modularized module, (b) a hexagonal face member mounted to said separate support housing and having an antenna for transmitting and receiving radio frequency signals, and (c) circuitry within and mounted to said separate support housing for:

(1) conducting radio frequency signals to said antenna for transmission by said antenna, and (2) conducting radio frequency signals received by said antenna from said antenna for processing; and means for fixing said radio frequency transmitting and receiving modules in said desired pattern, wherein each separate support housing includes walls configured to form a hexagonal perimeter, and at least one of the walls of one support housing of a modularized module is touching at least one of the walls of a support housing of another modularized module.

15. An array of radio frequency transmitting and receiving modules according to claim 14 wherein each antenna is a high-power, reflective-cavity backed spiral antenna composed of first and second interlaced spiral windings.

16. An array of radio frequency transmitting and receiving modules comprising:

a plurality of radio frequency transmitting and receiving modularized modules disposed in a desired pattern and each having:

(a) a separate support housing for each modularized module including:

(1) a first end plate, (2) a second end plate secured to said first end plate, and (3) a cowling extending around and secured to the peripheral edges of said first end plate and said second end plate and enveloping said first end plate and said second end plate, (b) an antenna mounted to said first end plate for transmitting and receiving radio frequency signals, and (c) circuitry including:

(1) a transmit/receive module on a first substrate, and (2) control electronics and power conditioning networks on a second substrate within said housing and sandwiched between said first end plate and said second end plate for:

(1) conducting radio frequency signals to said antenna for transmission by said antenna, and (2) conducting radio frequency signals received by said antenna from said antenna for processing; and means for fixing said radio frequency transmitting and receiving modularized modules in said desired pattern, wherein each separate support housing includes walls configured to form a hexagonal perimeter, and at least one of the walls of one support housing of a modularized module is touching at least one of the walls of a support housing of another modularized module.

17. An array of radio frequency transmitting and receiving modules according to claim 16 wherein:

(a) each first end plate is hexagonal, (b) each second end plate is hexagonal and aligned with that first end plate in the same module, (c) each cowling is hexagonal, and (d) each antenna is a high-power, reflective-cavity backed spiral antenna composed of first and second interlaced spiral windings.

18. An array of radio frequency transmitting and receiving modules according to claim 17 wherein said means for fixing said radio frequency transmitting and receiving modules in said desired pattern include:

(a) a first pair of rear mounting claws on a first hexagonal edge of a second end plate of a first module, (b) a second pair of rear mounting claws on a second hexagonal edge adjacent said first hexagonal edge of said second end plate of said first module, (c) a pair of rear mounting pockets on a hexagonal edge of a second end plate of a second module within which said first pair of rear mounting claws are received, (d) a pair of rear mounting pockets on a hexagonal edge of a second end plate of a third module within which said second pair of rear mounting claws are received, (e) a first forward mounting claw on a first hexagonal edge of a first end plate of said first module, (f) a second forward mounting claw on a second hexagonal edge adjacent said first hexagonal edge of said first end plate of said first module, (g) a forward mounting pocket on a hexagonal edge of a first end plate of said second module within which said first forward mounting claw is received, and (h) a forward mounting pocket on a hexagonal edge of a first end plate of said third module within which said second forward mounting claw is received.

* * * * *